United States Patent
Williams et al.

(10) Patent No.: US 10,890,490 B2
(45) Date of Patent: *Jan. 12, 2021

(54) THERMOGRAPHY PROCESS FOR CONVERTING SIGNAL TO TEMPERATURE IN A THERMAL IMAGING SYSTEM

(71) Applicant: Seek Thermal, Inc., Goleta, CA (US)

(72) Inventors: Ross E. Williams, Santa Barbara, CA (US); William J. Parrish, Santa Barbara, CA (US); Jason Wolfe, Santa Barbara, CA (US)

(73) Assignee: Seek Thermal, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,387

(22) Filed: Mar. 4, 2020

(65) Prior Publication Data

US 2020/0200608 A1 Jun. 25, 2020

Related U.S. Application Data

(63) Continuation-in-part of application No. 15/843,667, filed on Dec. 15, 2017, now Pat. No. 10,605,668.

(60) Provisional application No. 62/436,964, filed on Dec. 20, 2016.

(51) Int. Cl.
*G01J 5/00* (2006.01)
*G01J 5/10* (2006.01)
*H04N 5/33* (2006.01)

(52) U.S. Cl.
CPC .......... *G01J 5/10* (2013.01); *G01J 2005/0048* (2013.01); *G01J 2005/0081* (2013.01); *G01J 2005/106* (2013.01); *H04N 5/33* (2013.01)

(58) Field of Classification Search
CPC ................. G01J 2005/0077; G01J 2005/0085
See application file for complete search history.

(56) References Cited

U.S. PATENT DOCUMENTS

| | | | |
|---|---|---|---|
| 6,222,454 B1 | 4/2001 | Harling et al. | |
| 7,304,297 B1 | 12/2007 | King et al. | |
| 7,750,301 B1 | 7/2010 | Woolaway | |

(Continued)

*Primary Examiner* — Y Lee
(74) *Attorney, Agent, or Firm* — Knobbe Martens Olson & Bear LLP

(57) ABSTRACT

A thermography process for thermal imaging systems produced in quantity, including an imaging sensor and an ambient temperature sensor, that includes operations at three different places in the manufacture and actual use of the system. A temperature calibration may be performed on all units of a given design at a small number of controlled scene temperatures at one ambient temperature to produce a function that relates sensor signal to scene temperature. The function is determined for each individual unit and may be unique for each unit. Selected calibrated units may be subjected to a qualification test where they are exposed to larger number of controlled scene temperatures at a plurality of controlled ambient temperatures and the errors between the calibration derived function and the observed results and/or the actual scene temperatures at the various scene/ambient temperature combinations may be derived and put into a table that is loaded into all production units. In actual use of the imaging system, for any given actual observed signal and temperature sensor values, the corresponding scene temperature and/or error may be derived from the table and used to modify the temperature value from the calibration function.

16 Claims, 10 Drawing Sheets

(56) References Cited

U.S. PATENT DOCUMENTS

| | | |
|---|---|---|
| 8,212,210 B2 | 7/2012 | Hargel |
| 8,340,414 B2 | 12/2012 | Högasten et al. |
| 8,565,547 B2 | 10/2013 | Strandemar |
| 8,749,635 B2 | 6/2014 | Högasten et al. |
| 9,279,728 B2 | 3/2016 | Roth et al. |
| 2002/0074499 A1 | 6/2002 | Butler |
| 2005/0029453 A1 | 2/2005 | Allen et al. |
| 2008/0210872 A1 | 9/2008 | Grimberg |
| 2009/0024023 A1 | 1/2009 | Welches et al. |
| 2009/0272888 A1 | 11/2009 | Nugent et al. |
| 2010/0058222 A1 | 3/2010 | Bergstrom et al. |
| 2012/0239330 A1 | 9/2012 | Tremblay et al. |
| 2012/0262584 A1 | 10/2012 | Strandemar |
| 2013/0147966 A1 | 6/2013 | Kostrzewa et al. |
| 2013/0222604 A1 | 8/2013 | Ingerhed et al. |
| 2014/0015982 A9 | 1/2014 | Strandemar |
| 2014/0232875 A1 | 8/2014 | Boulanger et al. |
| 2015/0009335 A1 | 1/2015 | Strandemar |
| 2015/0109454 A1 | 4/2015 | Strandemar |
| 2015/0169169 A1 | 6/2015 | Andersson |
| 2015/0312488 A1 | 10/2015 | Kostrzewa et al. |
| 2016/0041039 A1 | 2/2016 | Olsson |
| 2016/0065848 A1 | 3/2016 | LeBeau et al. |

THERMOGRAPHY PROCESS FOR CONVERTING SIGNAL TO TEMPERATURE IN A THERMAL IMAGING SYSTEM

CROSS-REFERENCE TO RELATED APPLICATIONS

This application is a continuation-in-part of U.S. application Ser. No. 15/843,667, filed Dec. 15, 2017, entitled "THERMOGRAPHY PROCESS FOR CONVERTING SIGNAL TO TEMPERATURE IN A THERMAL IMAGING SYSTEM," which claims the benefit of U.S. Provisional Application Ser. No. 62/436,964, filed Dec. 20, 2016, entitled "THERMOGRAPHY PROCESS FOR A THERMAL IMAGING SYSTEM," both of which are hereby incorporated by reference in their entirety and for all purposes.

BACKGROUND

Field

The present disclosure generally relates to thermography processes for thermal imaging systems, such as thermal imaging cameras and sensors, and in particular to processes applicable to production thermal imaging systems.

Description of Related Art

The increasing availability of high-performance, low-cost uncooled thermal imaging devices, such as those based on bolometer focal plane arrays (FPAs), is enabling the design and production of consumer-oriented thermal imaging cameras and sensors capable of quality thermal imaging. Such thermal imaging systems have long been expensive and difficult to produce, thus limiting the employment of high-performance, long-wave imaging to high-value instruments, such as aerospace, military, or large-scale commercial applications. Thermal imaging systems of a given design produced in quantity may have different design requirements than complex military or industrial systems. Achieving accurate thermography is such system, i.e. the accurate conversion of image data to scene temperature, may require new approaches and techniques.

SUMMARY

Example embodiments described herein have innovative features, no single one of which is indispensable or solely responsible for their desirable attributes. Without limiting the scope of the claims, some of the advantageous features will now be summarized.

In some embodiments, a thermography process for thermal imaging systems produced in quantity, including an imaging sensor and an ambient temperature sensor, may be provided that includes operations at three different places in the manufacture and actual use of the system. A temperature calibration may be performed on all units of a given design at a small number of controlled scene temperatures at one ambient temperature to produce a function that relates sensor signal to scene temperature. The function is determined for each individual unit and may be unique for each unit. Selected calibrated units may be subjected to a qualification test where they are exposed to larger number of controlled scene temperatures at a plurality of controlled ambient temperatures and the errors between the calibration derived function and the observed results and/or the actual scene temperature at the various scene/ambient temperature combinations may be derived and put into a table that is loaded into all production units. In actual use of the imaging system, for any given actual observed signal and temperature sensor values, the corresponding scene temperature error and/or actual scene temperature may be derived from the table and used to modify the temperature value from the calibration function.

In one embodiment a process may be provided for converting signal to temperature for a set of production thermal imaging systems, each system of the set of thermal imaging systems including an array of photodetectors each configured to output a signal $S_{x,y}$ corresponding to a temperature of a portion of an imaged scene, and an ambient temperature sensor. The process may include performing three operations at different phases of the imaging system manufacture and use. The first operation may be performing a scene temperature calibration on all thermal imaging systems of the set of thermal imaging systems, the calibration comprising: exposing each thermal imaging system, at a calibration ambient temperature, to n known temperature scenes, each known temperature scene having a unique scene temperature $T_{si}$, from $T_{s1}$ to $T_{sn}$, wherein n is at least 2; developing, based on the signal $S_{x,y}$, a unit-specific function, $F(S_{x,y})_i = T s_i$ that fits the observed signal to the known scene temperatures for each thermal imaging system; and storing an ambient temperature sensor value $T_{sen}$ corresponding to the calibration ambient temperature. The second operation may include performing a scene temperature/ambient temperature qualification test on a subset of previously calibrated thermal imaging systems of the set of thermal imaging systems, the qualification test including: exposing each thermal imaging system of the subset to a plurality of known ambient temperatures and, at each ambient temperature, exposing the unit to a plurality of known temperature scenes at different scene temperatures, obtaining a function $F(S_{x,y})$ for each combination of ambient temperature and scene temperature; correlating the ambient temperature sensor output to the known ambient temperatures; and creating a two dimensional table of at least one of an error $\Delta T$ between $F(S_{x,y})$ and the known scene temperature for each known scene at each ambient temperature, or the known scene temperature $T_{act}$. The third operation may include, for individual thermal imaging systems of the set of thermal imaging systems, adjusting $F(S_{x,y})$ during subsequent operational use by extracting at least one of actual scene temperature or error information from the two-dimensional table based on $S_{x,y}$ and the ambient temperature sensor value.

In some embodiments the known temperature scenes for both the calibration and qualification may be blackbodies set at predetermined temperatures. In some embodiments the plurality of ambient temperatures may be produced by placing the unit in a temperature chamber and changing the chamber temperature in a predetermined manner.

In some embodiments the calibration ambient temperature may be room temperature, and the temperature sensor value is $T_{senrt}$. In some embodiments the correlation to the chamber temperatures may be developed for $\Delta Therm = T_{sens} - T_{sensrt}$. In some embodiments $F(S_{x,y}) = G(S_{x,y}) + O$. where G is a gain term and O is an offset term.

In some embodiments the axes of the two dimensional table may be the values of $F(S_{x,y})$ corresponding to each blackbody temperature and $\Delta Therm$ values corresponding to each chamber temperature. In some embodiments the temperature associated with photodetector signal during operation may be at least one of $T_{x,y} = G(S_{x,y}) + O + \Delta T$ or $T_{x,y} = T_{act x,y}$.

In some embodiments the table developed may be stored as a look-up table in all units of the given design, and the inputs may be actual signal $F(S_{x,y})$ and $\Delta Therm$. In some embodiments during unit operation if any given $F(S_{x,y})$ and $\Delta Therm$ are not exactly equal to the table axis values, the error value $\Delta T$ used may be determined by one of a 3 step linear interpolation, a bi-linear interpretation, or a bi-cubic interpolation of the table error values.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
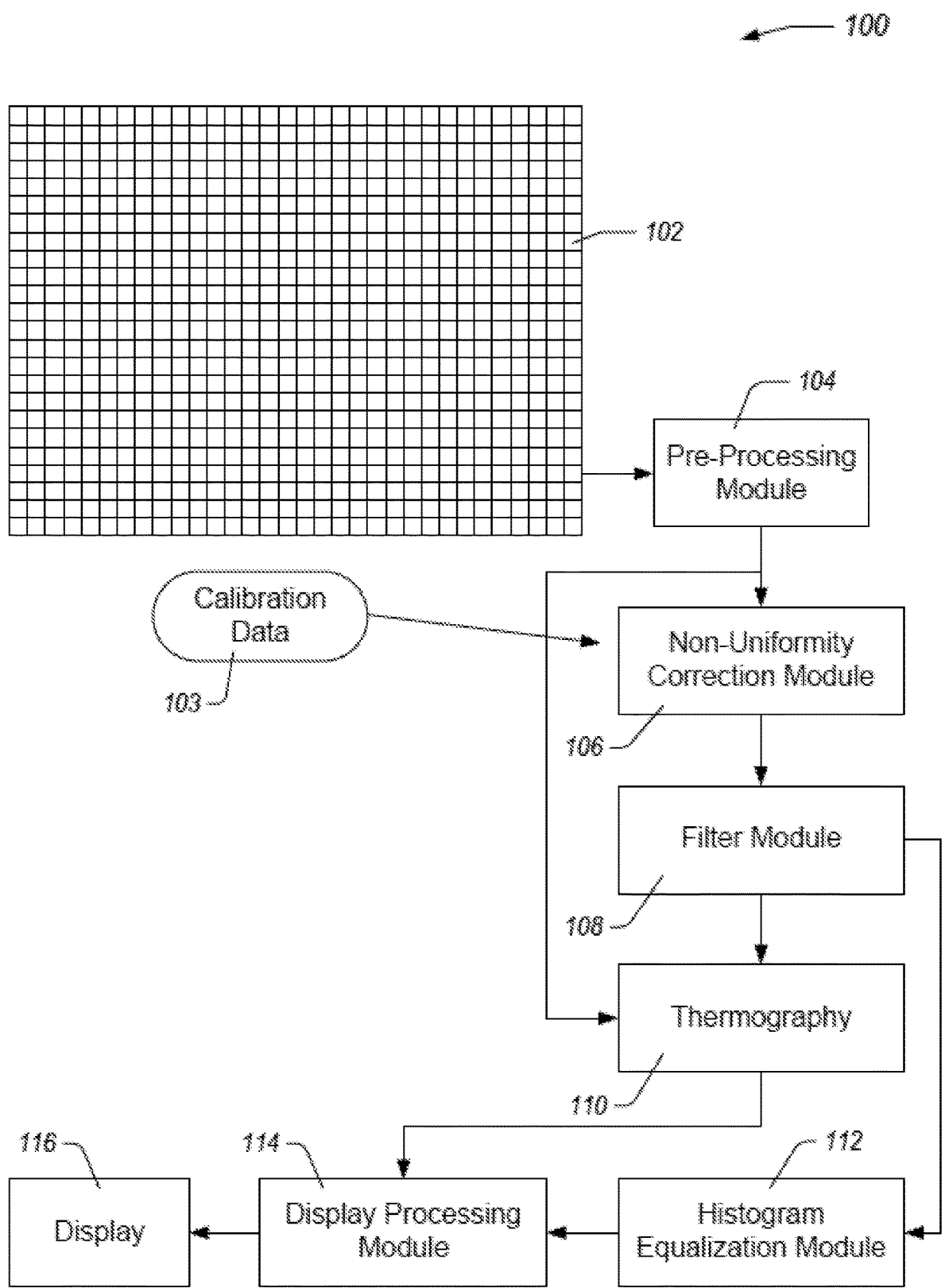
FIG. 1A illustrates a functional block diagram of an example imaging system.

Generally described, embodiments of the present disclosure relate to improving the accuracy of converting the signal output of a thermal imaging system when imaging a given scene to the scene temperature. These embodiments relate to both the manufacture and test of imaging systems as well as their operational use. The present disclosure includes calibration elements performed on all units of a given system design as well as qualification elements performed on a selected number of calibrated units.

Examples and implementations described herein focus, for the purpose of illustration, on an imaging system including an infrared camera or sensor using a focal plane array. Various aspects of the disclosure will now be described with regard to certain examples and embodiments, which are intended to illustrate but not limit the disclosure. For many of these aspects, the example embodiments will describe an imaging system where the thermal sensor delivers image data to one or more processors which execute a series of image processing steps, which include the elements for thermography.

Some embodiments described herein provide for using thermography data from both manufacturing test for all units with qualification test data on selected units. Advantageously, this may allow for simpler and faster manufacturing testing.

Some embodiments described herein provide for using data from qualification testing to adjust thermography calculations during unit operation by a user. Advantageously, this may allow for increased thermography accuracy during post-calibration operational use of all units of a given thermal imaging system design.

The disclosed thermography processes may be implemented as modules or elements that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store computer programs or computer-executable instructions may be implemented along with discrete circuit components to carry out one or more of the methods described herein. In certain implementations, the disclosed methods may be implemented in conjunction with a one or more focal plane arrays (FPA) on a camera core, wherein the processor and memory components executing the disclosed methods may be on a processing device mated to the camera core, such as a mobile appliance including smart phones, tablets, personal computers, etc. In some implementations, the processing and memory elements of the imaging system may be in programmable logic or on-board processors that are part of the core or camera system. In general, digital control functions, image acquisition, image processing, and image display/analysis may be distributed across one or more digital elements or processors. Referring to a system processor or any controller in any of the disclosed embodiments should not be interpreted as implying the control and processing functionality resides in a single element.

As a particular example of some advantages provided by the disclosed systems and methods, an imaging system can include a thermal imaging focal plane array (FPA) configured to acquire images of a scene. The FPA can include a two-dimensional array of N detectors, the FPA configured to output a two-dimensional image of the scene. For imaging purposes, image frames, typically data from all or some of the detectors $N_f$, are produced by the FPA, each successive frame containing data from the array captured in successive time windows. Thus, a frame of data delivered by the FPA comprises $N_f$ digital words, each word representing a particular pixel, $S_{x,y}$, signal, in the image. These digital words are usually of a length determined by the analog to digital conversion (A/D) process. For example, if the pixel data is converted with a 14 bit A/D, the pixel words may be 14 bits in length, and there may be 16384 counts per word. For an IR camera used as a thermal imaging system, these words may correspond to an intensity of radiation measured by each pixel in the array. In a particular example, for a bolometer IR FPA the intensity per pixel usually corresponds to temperature of the corresponding part of the imaged scene, with lower values corresponding to colder regions and higher values to hotter regions. It may be desirable to display this data on a visual display.

Each pixel in an FPA may include a radiation detector that generates relatively small signals in response to detected radiation, such as in an infrared imaging array. These signals may be relatively small compared to signals or signal levels in the FPA arising from sources not caused by incident radiation, or non-image signals, wherein these non-image signals are related to the materials, structure, and/or components of the FPA. For example, pixels in an FPA can include interface circuitry including resistor networks, transistors, and capacitors on a readout integrated circuit (ROIC) that may be directly interfaced to the array of detectors. For instance, a microbolometer detector array, a microelectrical mechanical system (MEMS) device, may be manufactured using a MEMS process. The associated ROIC, however, may be fabricated using electronic circuit techniques. These two components can be combined together to form the FPA. The combination of the interface circuitry and the detector itself may have offset and temperature behaviors that are relatively large compared to the signals produced in response to incident radiation on the detectors. Thus, it is often desirable to compensate for these effects that are not related to the image signal before displaying or otherwise processing the image data.

Examples of image processing systems and methods are disclosed in U.S. patent application Ser. No. 14/829,500, filed Aug. 18, 2015, U.S. patent application Ser. No. 14/292,124, filed May 30, 2014, U.S. patent application Ser. No. 14/829,490, filed Aug. 18, 2015, U.S. patent application Ser. No. 14/817,989, filed Aug. 4, 2015, U.S. patent application Ser. No. 14/817,847, filed Aug. 4, 2015, each of which is incorporated by reference herein in its entirety. These referenced applications describe a variety of imaging system configurations and various techniques for adjusting for artifacts and correcting for degradations in image quality that arise at least in part due to various properties and characteristics of the imaging systems. These various image processing functions may be accomplished in a processing unit, which, as described, may either be part of a camera device, a processing device interfaced to the camera device, and/or distributed between the two. The processing unit may include, for some imaging systems, control functions for operating a shutter. A visible sensor, usually including a visible light sensitive FPA may also be used. Such visible imaging systems are common in digital cameras, Personal Electronic Devices (PED's) and the like. The resources used for image processing and display functions of the two sensors may be shared or separate as convenient for a particular system design. Systems including multiple imaging sensors of various or the same types may also benefit from the disclosed systems and methods.

Example Imaging Systems

FIG. 1A illustrates a functional block diagram of an example thermal imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. In some embodiments, the read out electronics outputs the data as a stream of a few columns or rows at a time. For instance some FPAs utilize a technique known as an electronic rolling shutter which activates the photodetectors during image acquisition in discrete increments, or sub-frames, of the total frame and outputs the sub-frames as they are acquired accordingly. Thus subsequent image processing may be configured to act on a sub-frame basis, working through the entire frame one or more sub-frames at a time. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a readout integrated circuit ("ROIC"). The array of microbolometers can be configured to generate electrical signals in response to a quantity of thermal radiation or a temperature. The ROIC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g. calibration data 103) that can be used during image processing to generate a superior image. For example, calibration data 103 may include bad pixel maps, and/or gain tables stored in data storage and retrieved by modules in the imaging system 100 to correct and/or adjust the pixel values provided by the focal plane array 102. Calibration data 103 may include gain tables. As described herein, the focal plane array 102 can include a plurality of pixels with integrated readout electronics. The readout electronics can have a gain associated with it, wherein the gain may be proportional to the transimpedance of a capacitor in the electronics. This gain value, which may in some implementations take the form of a pixel gain table, may be used by the image processing modules of the imaging system 100. Additional examples of calibration data for the imaging system 100 are provided in U.S. patent application Ser. No. 14/829,490, entitled "Gain Calibration for an Imaging System," filed Aug. 18, 2015, the entire contents of which is incorporated by reference herein. The calibration data 103 can be stored on the imaging system 100 or in data storage on another system for retrieval during image processing.

The imaging system 100 includes one or more modules configured to process image data from the focal plane array 102. One or more of the modules of the imaging system 100 can be eliminated without departing from the scope of the disclosed embodiments, and modules not shown may be present as well. The following modules are described to illustrate the breadth of functionality available to the disclosed imaging systems and not to indicate that any individual module or described functionality is required, critical, essential, or necessary. Modules such as non-uniformity correction module 106, the filter module 108, the thermography module 110, and/or the histogram equalization module 112 may be collectively described as an "image processing chain."

The imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter ("RDAC") functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on periodic measurement of a flat field image (e.g., an image acquired with the shutter closed). The adaptive RDAC functionality can implement an ongoing adjustment of the operating bias based at least in part on a measured or detected drift over time of the flat field image. The bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adaptive RDAC functionality are provided in U.S. patent application Ser. No. 14/829,500, filed Aug. 18, 2015, entitled "Adaptive Adjustment of the Operating Bias of an Imaging System," the entire contents of which is incorporated by reference herein.

Bad pixel replacement may be present as well, examples of which are described in U.S. Prov. App'n No. 62/297,669, entitled "Pixel Decimation for an Imaging System," and filed Feb. 19, 2016, the entire contents of which is incorporated by reference herein. Bad pixel replacement functionality, which may include pixel decimation, may have access to a bad pixel map, which may be part of calibration data. In various implementations, bad pixels may be identified within image data by observing if given pixels are outside of pre-determined tolerances or vary from their neighbors by more than pre-determined thresholds.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived from actuation of an in-operation calibration element such as intermittently closing a shutter over the focal plane array 102 to acquire uniform scene data. From this acquired uniform scene data, the non-uniformity correction module 106 can be configured to determine deviations from uniformity. The non-uniformity correction module 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter, and may use another type of in-operation element, and may rely on presenting known scenes to the imaging array as opposed to flat-field scenes. Some NUC techniques do not rely on physical calibration elements and use image processing techniques to derive a NUC. Additional examples of systems and methods for non-uniformity correction are described in U.S. patent application Ser. No. 14/817,847, entitled "Time Based Offset Correction for Imaging Systems," filed Aug. 4, 2015, the entire contents of which is incorporated by reference herein. Adaptive calibration or shutter control may include elements present in the pre-processing module 104 or equivalent, as well as parts of the image processing chain as described in in U.S. patent application Ser. No. 15/068,405, entitled "TIME BASED OFFSET CORRECTION FOR IMAGING SYSTEMS AND ADAPTIVE CALIBRATION," filed Mar. 11, 2016, the entire contents of which is incorporated by reference herein. Fixed Pattern Noise (FPN) mitigation if desired may take place as part of the NUC module in order to place this functionality early in the image processing chain. FPN mitigation should preferably take place after offset correction so could not reasonably happen before NUC. Or, in some cases, a Fixed Pattern Noise mitigation element could operate in parallel with or even instead of a NUC based on a shutter or other physical calibration element. Such approaches may be referred to as Scene Based NUC (SB-NUC). Additional examples of systems and methods for FPN mitigation and/or SBNUC are described in U.S. Pat. App'n No. 62/355,797, entitled "Fixed Pattern Noise Mitigation for a Thermal Imaging Systems" filed Jun. 27, 2016, the entire contents of which is incorporated by reference herein.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The image processing system 100 includes a filter module 108 configured to apply one or more temporal and/or spatial filters to address other image quality issues. For example, the readout integrated circuit of the focal plane array can introduce artifacts into an image, such as variations between rows and/or columns. The filter module 108 can be configured to correct for these row- or column-based artifacts, as described in greater detail in U.S. patent application Ser. No.

14/702,548, entitled "Compact Row Column Noise Filter for an Imaging System," filed May 1, 2015, the entire contents of which is incorporated by reference herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like. For the case where pixel decimation with bad pixel replacement is desired, the bad pixel functionality may be placed earlier in the chain.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail in U.S. patent application Ser. No. 14/956,111, entitled "Image Adjustment Based on Locally Flat Scenes," filed Dec. 1, 2015, the entire contents of which is incorporated by reference herein.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter, and/or a bandpass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace specific pixel data, as opposed to wider image area data, with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in U.S. patent application Ser. No. 14/817,989, entitled "Local Contrast Adjustment for Digital Images," filed Aug. 4, 2015, the entire contents of which is incorporated by reference herein. High-pass filter results, of the type described above, or in any form suitable for image processing functionality, may be employed as all or part of the information used for adaptive shutter control, as described herein with reference to FIG. 9. Highpass filter and related techniques may be used to detect edge features in an image as well.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The image processing system 100 includes a thermography module 110 configured to convert intensity to temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. patent application Ser. No. 14/838,000, entitled "Thermography for a Thermal Imaging Camera," filed Aug. 27, 2015, the entire contents of which is incorporated by reference herein. The current disclosure relates to alternative approaches to the above referenced application for use cases where increased accuracy of the thermography derived scene temperature relative to actual scene temperature may be desired.

The image processing system 100 includes a histogram equalization module 112, or other display conversion module (compression modules for example, or combinations of different techniques), configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram module 112 can be configured to adjust pixel values of the image in a manner that avoids using the limited display range of the display 116 on scene intensity values where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words, which is related to analog to digital (A/D) conversion resolution. For instance, the A/D sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein.

The imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described in U.S. patent application Ser. No. 14/851,576, entitled "Selective Color Display of a Thermal Image," filed Sep. 11, 2015, the entire contents of which is incorporated by reference herein. The Display Processing Module 114 may also contain or interface to a display driver which converts color table values to actual luminance color values to drive the display 116, such as RGB, yCV etc.

The display 116 can be configured to display the processed image data. The display 116 can also be configured to accept input to interact with the image data and/or to control the imaging system 100. For example, the display 116 can be a touchscreen display.

The imaging system 100 can be provided as a standalone device, such as a thermal sensor. For example, the imaging system 100 can include an imaging system housing configured to enclose hardware components (e.g., the focal plane array 102, read out electronics, microprocessors, data storage, field programmable gate arrays and other electronic components, and the like) of the imaging system 100. The imaging system housing can be configured to support optics configured to direct light (e.g., infrared light, visible light, etc.) onto the image sensor 102. The housing can include one or more connectors to provide data connections from the imaging system 100 to one or more external systems. The housing can include one or more user interface components to allow the user to interact with and/or control the imaging system 100. The user interface components can include, for example and without limitation, touch screens, buttons, toggles, switches, keyboards, and the like.

In some embodiments, the imaging system 100 can be part of a network of a plurality of imaging systems. In such embodiments, the imaging systems can be networked together to one or more controllers.

Figure 1B:
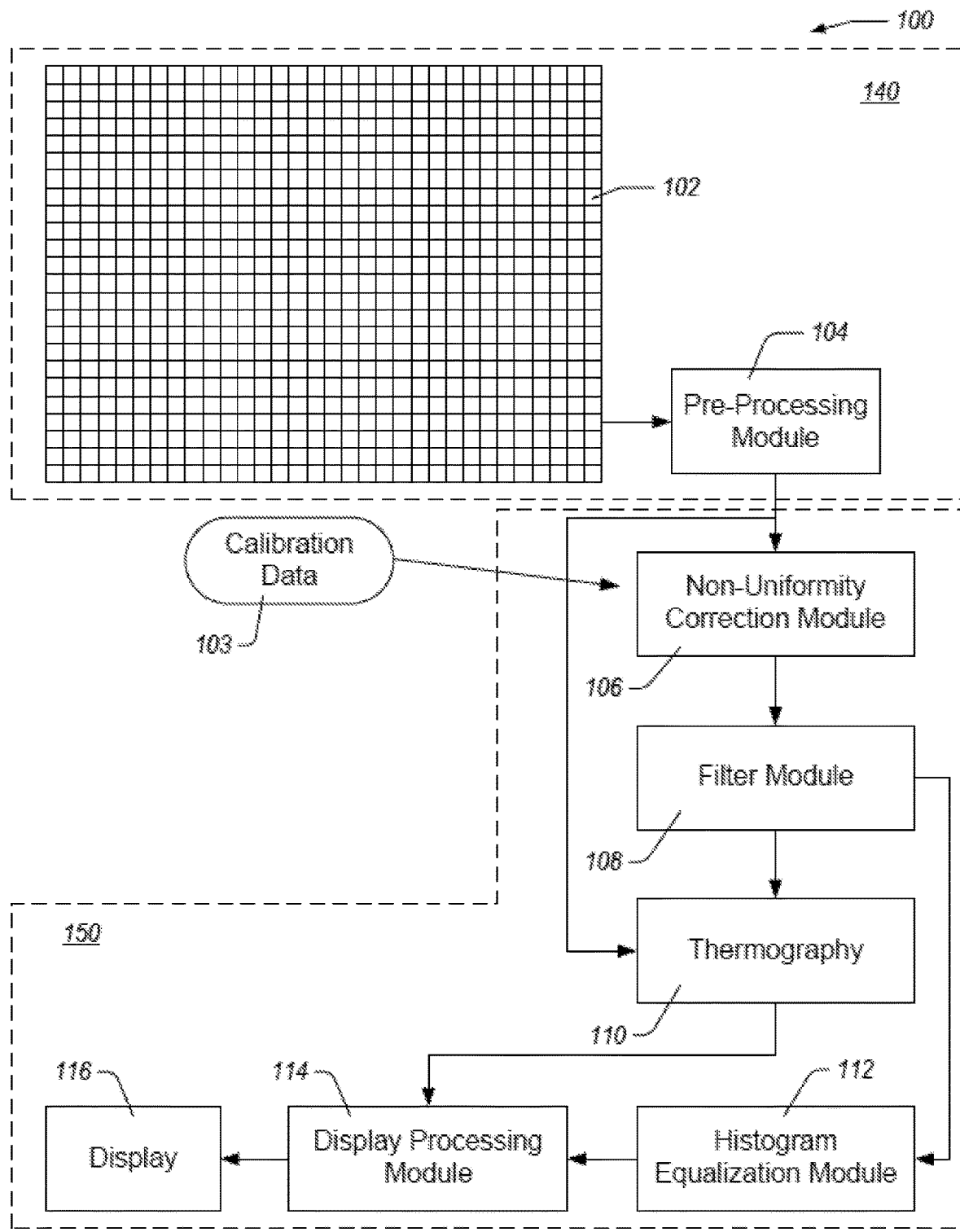
FIG. 1B illustrates a functional block diagram of the example imaging system illustrated in FIG. 1A, wherein functionality of the imaging system is divided between a camera and a mobile electronic device.

FIG. 1B illustrates a functional block diagram of the example imaging system 100 illustrated in FIG. 1A, wherein functionality of the imaging system 100 is divided between a camera or sensor 140 and a processing device 150. Processing device 150 may be a mobile device or other computing device. By dividing image acquisition, pre-processing, signal processing, and display functions among different systems or devices, the camera 140 can be configured to be relatively low-power, relatively compact, and relatively computationally efficient compared to an imaging system that performs a majority or all of such functions on board. As illustrated in FIG. 1B, the camera 140 is configured to include the focal plane array 102 and the pre-processing module 104. In some embodiments, one or more of the modules illustrated as being part of the processing device 150 can be included in the camera 140 instead of in the processing device 150. In some embodiments, certain advantages are realized based at least in part on the division of functions between the camera 140 and the processing device 150. For example, some pre-processing functions can be implemented efficiently on the camera 140 using a combination of specialized hardware (e.g., field-programmable gate arrays, application-specific integrated circuits, etc.) and software that may otherwise be more computationally expensive or labor intensive to implement on the processing device 150. Accordingly, an aspect of at least some of the embodiments disclosed herein includes the realization that certain advantages may be achieved by selecting which functions are to be performed on the camera 140 (e.g., in the pre-processing module 104) and which functions are to be performed on the processing device 150 (e.g., in the thermography module 110).

An output of the camera 140 can be a stream of digital data representing pixel values provided by the pre-processing module 104. The data can be transmitted to the processing device 150 using electronic connectors (e.g., a micro-USB connector, proprietary connector, etc.), cables (e.g., USB cables, Ethernet cables, coaxial cables, etc.), and/or wirelessly (e.g., using BLUETOOTH, Near-Field Communication, Wi-Fi, etc.). The processing device 150 can be a smartphone, tablet, laptop, computer or other similar portable or non-portable electronic device. In some embodiments, power is delivered to the camera 140 from the processing device 150 through the electrical connectors and/or cables.

The imaging system 100 can be configured to leverage the computing power, data storage, and/or battery power of the processing device 150 to provide image processing capabilities, power, image storage, and the like for the camera 140. By off-loading these functions from the camera 140 to the processing device 150, the camera can have a cost-effective design. For example, the camera 140 can be configured to consume relatively little electronic power (e.g., reducing costs associated with providing power), relatively little computational power (e.g., reducing costs associated with providing powerful processors), and/or relatively little data storage (e.g., reducing costs associated with providing digital storage on the camera 140). This can reduce costs associated with manufacturing the camera 140 due at least in part to the camera 140 being configured to provide relatively little computational power, data storage, and/or power, because the imaging system 100 leverages the superior capabilities of the processing device 150 to perform image processing, data storage, and the like.

Concepts of Thermography Process

The present disclosure relates primarily to thermal imaging system capable of measuring and/or indicating a temperature for all or a portion of a scene. The systems may additionally be configured provide thermal images of the scene. The process of converting thermal image data to temperature is often referred to as thermography. in various embodiments, the conversion from image signal to temperature may be accomplished individually for each pixel, or for selected pixels or small groups of pixels. Per pixel/pixel group conversion is sometimes referred to as spot thermography. Alternatively or in addition to spot thermography, a temperature representative of a whole scene or large portion of a scene may be the desired outcome. Often both modes may be desirable alternatively or simultaneously in an imaging system.

As discussed above, thermal imaging systems, particularly micro-bolometer based, inexpensive mass market oriented systems are susceptible to a wide range of effects that affect image quality and accuracy. In particular, the conversion of image signal to image temperature may be affected by both scene signal amplitude, (e.g., scene temperature), and the ambient temperature the imaging sensor, (e.g., FPA), is exposed to. The effects of scene and ambient temperature may vary from device to device, and the variation may be present at multiple levels of the system, including pixel to pixel variation within an individual unit, unit to unit variation within a given design, and from design to design. Higher cost imaging systems may provide more tools to mitigate these effects, such as means for sensor ambient temperature control, and controlled or known temperature calibration devices, such as temperature controlled or temperature monitored shutter flags. The present disclosure is directed to systems with limited tools for mitigation of temperature effects.

Certain embodiments of the present disclosure can be implemented in an imaging system with an integral ambient temperature sensor of a simple inexpensive implementation. Accordingly, the integral temperature sensor is not necessarily directly connected to the FPA. Moreover, the temperature sensor performance may vary from unit to unit. The thermography process of the present disclosure can make use of the temperature sensor as well as data acquired at various stages in system manufacturing.

Example Thermography Process

Figure 2:
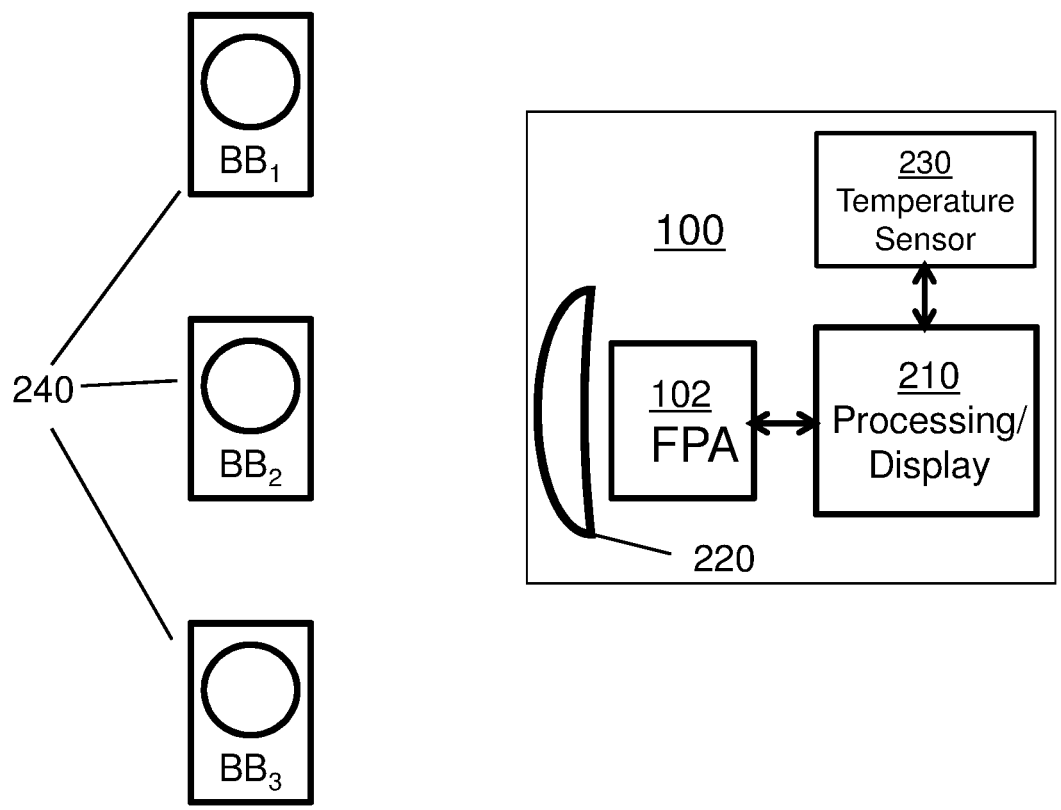
FIG. 2 illustrates an example calibration test set-up.

Referring to FIG. 2, the basic elements of a thermal imaging system 100 are shown. FPA 102 views the scene through optics 220. FPA 102 signals are processed and displayed or otherwise presented to a user from processing and display elements shown collectively as element 210. An ambient temperature sensor 230 is in communication with the processing and display elements 210. The ambient temperature sensor 230 may be located adjacent to or even on FPA 102. In some embodiments, proximity between the ambient temperature sensor 230 and the FPA 102 may be desirable for accurate determination of an ambient temperature near the FPA 102. However, as long as the ambient temperature sensor 230 is internal to the thermal imaging system 100 (e.g., within a system housing also enclosing the FPA 102), a substantially fixed relationship can exist between data from the temperature sensor 230 and the temperature of the FPA 102, at least when the ambient and/or FPA temperature are stable enough for the system to be in internal temperature equilibrium. The farther away from the FPA 102 the ambient temperature sensor 230 is placed, the less accurate thermography will be during periods of rapid temperature change, such as FPA warm-up and abrupt ambient temperature changes such as a user taking a system from indoors to out.

FIG. 2 shows a test set-up for a scene temperature calibration that can be performed on some or all units as part of a manufacturing test. In the test set-up of FIG. 2, the thermal imaging system 100 is held at a first ambient temperature, such that the FPA 102 is maintained at the first ambient temperature. In the simplest case, this could be room temperature of the test area, relying on the temperature control of the test area. In some embodiments, the temperature can be controlled in a more dedicated manner, for example, in a temperature chamber or controlled temperature holding fixture. Preferably, all units can be tested at the same controlled ambient temperature. The degree of control can vary from active temperature control of the system, such as a temperature chamber or controlled temperature holding fixture, to relying on the ambient temperature control of the room where testing is accomplished. Utilizing a controlled and repeatable test temperature may advantageously reduce error in thermography conversion during later operational use. During calibration, each thermal imaging system 100 to be tested is powered up and allowed to come to internal temperature equilibrium before test data is acquired. Time to equilibrium can be system design dependent and may be determined empirically, or directly by observing the output of the temperature sensor 230 and waiting for it to stabilize.

During calibration, each unit is exposed to at least two scenes of different known temperatures. These scenes may be flatfield, e.g., configured such that the field of view (FOV) of the unit observes a uniform known temperature scene. The calibration scenes can be configured so that each pixel in the FPA 102 is exposed to a known temperature. In the example calibration set-up of FIG. 2, there are three flat field scenes held at three different scene temperatures, implemented as three black bodies 240, each at a different temperature and configured such that the thermal imaging system 100 is made to observe each black body 240 in turn with the black body 240 filling the unit FOV, or at least the portion of the unit pixels to be calibrated. This portion will usually be all pixels, although the calibration may be implemented with the black body 240 filling less than all pixels.

From the scene images acquired at the different scene temperatures, a function is derived that relates sensor signal intensity S to scene temperature $T_s$ such that $F(S)=T_{si}$ for each temperature scene i=1 to n where for the example in FIG. 2, n=3. The function F may be derived globally for all pixels, i.e. each pixel for a given FPA uses the same function. However, it may be desirable to derive F on a more granular scale, such as groups of pixels will share a function individually derived for the group. If computing and memory resources allow it may be desirable to derive the function individually for each pixel such that F(S) is actually $F(S_{x,y})$, where $S_{x,y}$ is the sensor signal intensity of the pixel located at coordinates (x,y).

In one non-limiting example, a function that yields acceptable results is a 3 point linear fit, $T_s=G(S_{x,y})+O$. Generally described, this 3 point linear fit applies a gain term G and an offset term O to the sensor intensity signal $S_{(x,y)}$ for this function. In terms of thermography, the results of the calibration test is that the function, $F(S_{x,y})$ or a portion thereof is saved, e.g., G and O are saved for the linear fit example. Also saved is the temperature sensor value observed during test, $T_{sens}$ after equilibrium is achieved. This value may correspond to room temperature, or a controlled test temperature. The saved value may be labeled a $T_{sensrt}$ for illustrative purposes. The function, or at least the details, e.g., specific coefficients, may, and often does vary from unit to unit, and even pixel to pixel within each unit.

For the case n=2, a similar, simpler linear fit may be employed yielding equivalent G, O terms (e.g., gain and offset).

Figure 3:
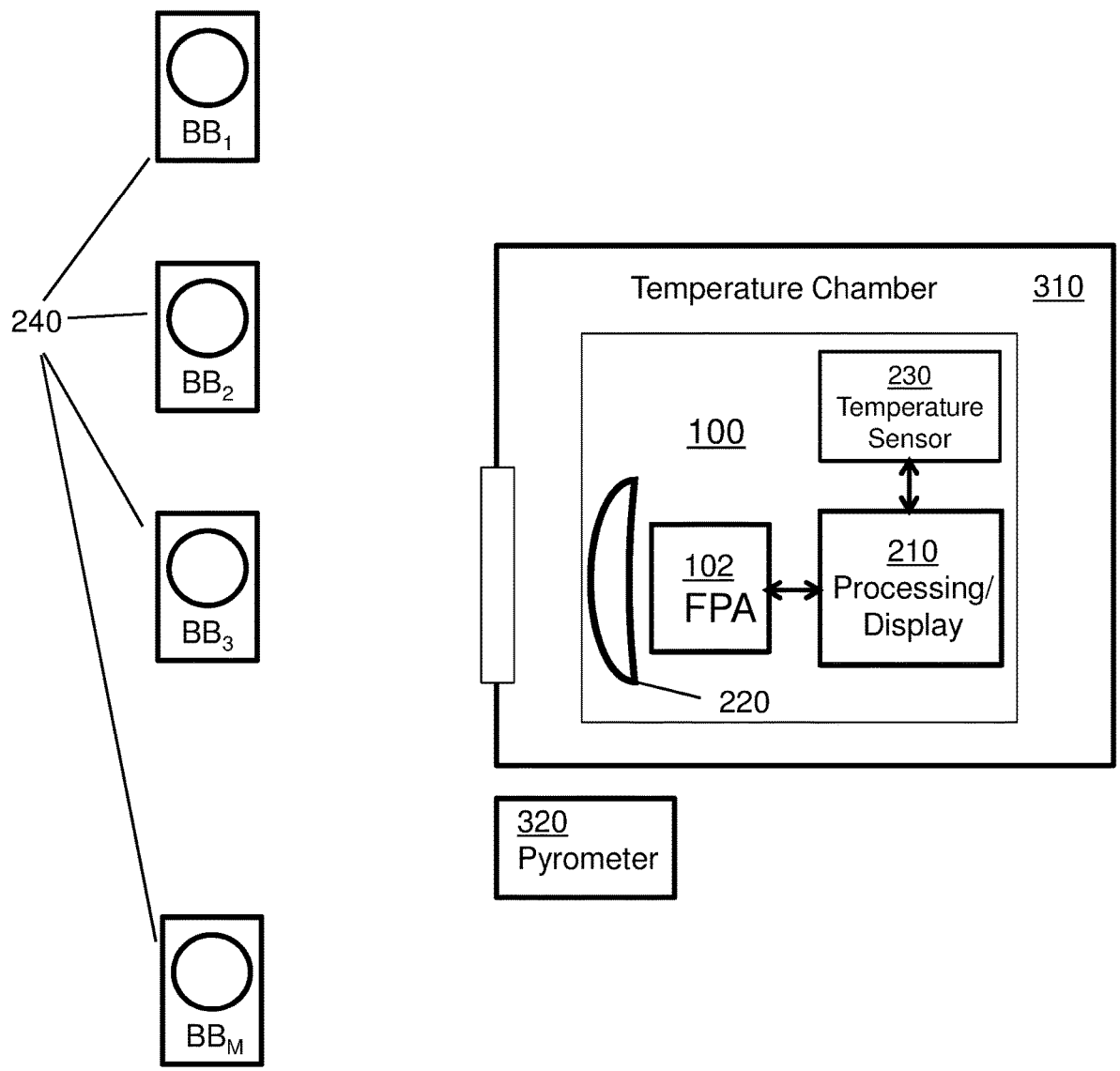
FIG. 3 illustrates an example qualification test set-up.

FIG. 3 illustrates an additional qualification test which can be performed on a selected subset of units which have already been calibrated, e.g., already have $F(S_{x,y})$ and $T_{sensrt}$ stored as described above with reference to FIG. 2. The purpose of the qualification is to provide further information that can be stored in all units to improve the thermography accuracy. The qualification test is aimed at four sources of thermography error: the dependence of the conversion on scene temperature, the dependence on sensor ambient temperature, the variation in offset from temperature sensor to sensor, and the temperature sensor to sensor variation in offset.

The qualification test is performed at multiple scene temperatures and at multiple controlled ambient temperatures. In the example test set-up of FIG. 3, the multiple scene temperatures are produced with several temperature controlled black bodies 240, each set at a different temperature covering a range of expected scene temperatures. For instance, in an example test set-up, sixteen black bodies (e.g., M=16 in FIG. 3) covering a possible temperature range, e.g., from −15° C. to 500° C. In the example test set-up, the blackbodies can be in a normal room environment, so particularly for lower than room temperature settings (e.g., if frosting occurs) the actual black body surface temperature may not correspond to the setting. Accordingly, the surface temperature can be monitored with a pyrometer 320, and the pyrometer value may be used for the scene temperature. Different products may require different scene temperature ranges, but the example test set-up provides sixteen scene temperature data points for any range within the above limits.

The qualification test may also include testing at multiple controlled imaging sensor ambient temperatures as well. In the example set-up of FIG. 3, the imaging system 100 can be placed in a controllable temperature chamber 310, configured to view each black body 240 sequentially. The chamber may be programmed to cover a wide range of temperatures, for example from −40° C. to 80° C. in 10 degree increments for 12 ambient temperature data points. The black bodies 240 for instance may be mounted on a wheel around the view port of the chamber. However the scene temperatures and/or the ambient temperatures are controlled and sequenced, the desired result is each scene temperature is imaged at the multiple ambient temperatures.

For each scene temperature at each ambient temperature, the actual known scene temperature is compared to the value derived from $F(S_{x,y})$ and the difference, or thermography error, $\Delta T$, is stored in a table with one axis being the reported scene temperature and the other the controlled sensor ambient temperature. Alternatively the actual temperature, $T_{act}$ may be stored along with or instead of the error. The value of the temperature sensor, $T_{sens}$ is correlated with each ambient temperature. Alternatively, to adjust for offset differences from temperature sensor to temperature sensor, the value saved from calibration may be subtracted from the $T_{sesn}$ to create an offset corrected term $\Delta Therm = T_{sens} - T_{sensrt}$.

Figure 4:
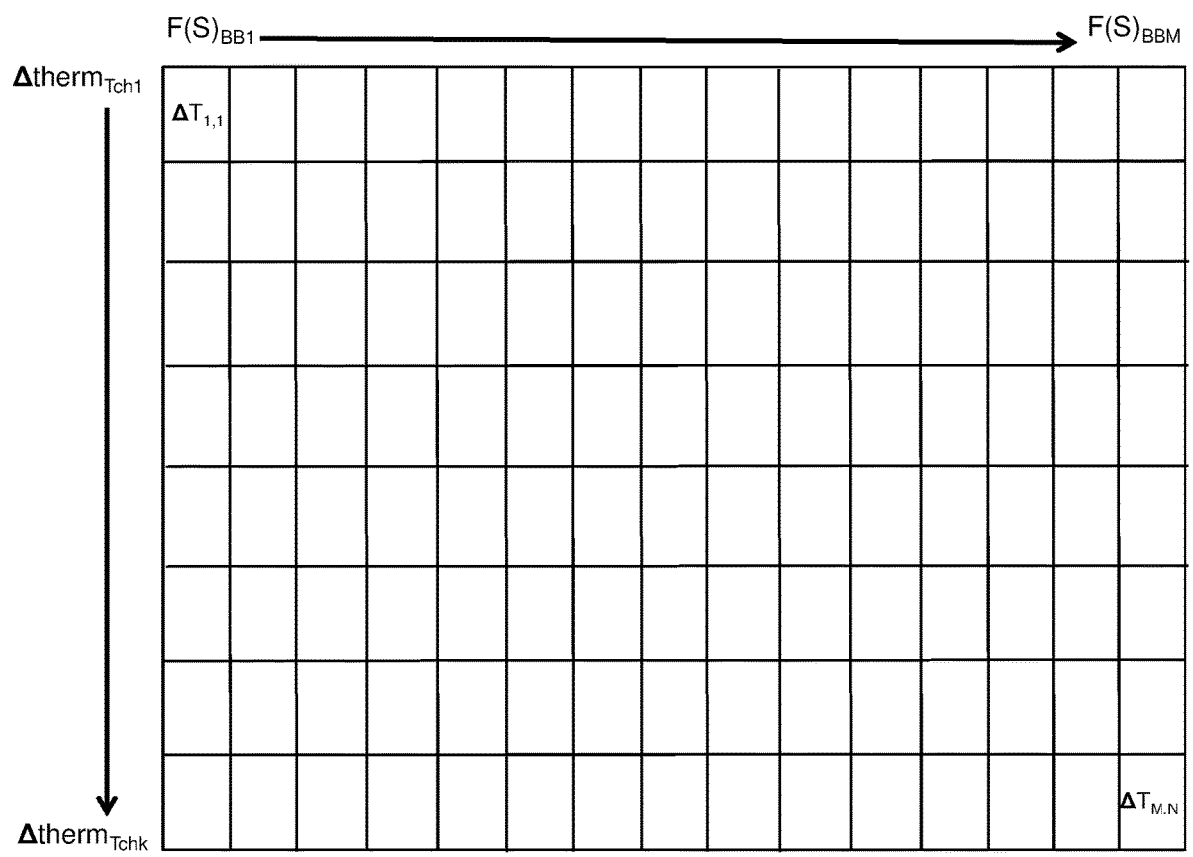
FIG. 4 illustrates an example of a temperature error look up table (LUT).

Accordingly an error table as shown in FIG. 4 is created with one axis being $F(S)_{BBm}$ with m=1 to M, the number of test scene temperatures, the other axis being $T_{senschk}$ or in some embodiments, $\Delta Therm_{chk}$, where k=1 to K, the number of ambient temperature data points, and each point is the temperature sensor data corresponding to the actual ambient temperature at each test point. The qualification test may be done for one or more units of a given design, and the error table may be produced by aggregating the results from multiple units, such as averaging each resultant error. The table may be derived for any number of pixels, including an error table for each pixel. The resultant tables are stored into each production unit. During actual use by a user, for any given actual observed signal and temperature value, the closest corresponding error $\Delta T$ is found on the table and the reported scene temperature is adjusted by that error. For the linear fit example, actual reported $T_{x,y} = G(S_{x,y}) + O + \Delta T_{x,y}$ or simply equal to the closest value of $T_{actx,y}$.

For greater accuracy, interpolation may be used when $F(S_{x,y})$ and/or $\Delta Therm$ lie between the table data points. Possible interpolation techniques include three step linear, bi-linear, or bi-cubic interpolations.

Example Thermography Process Steps

Figure 5:
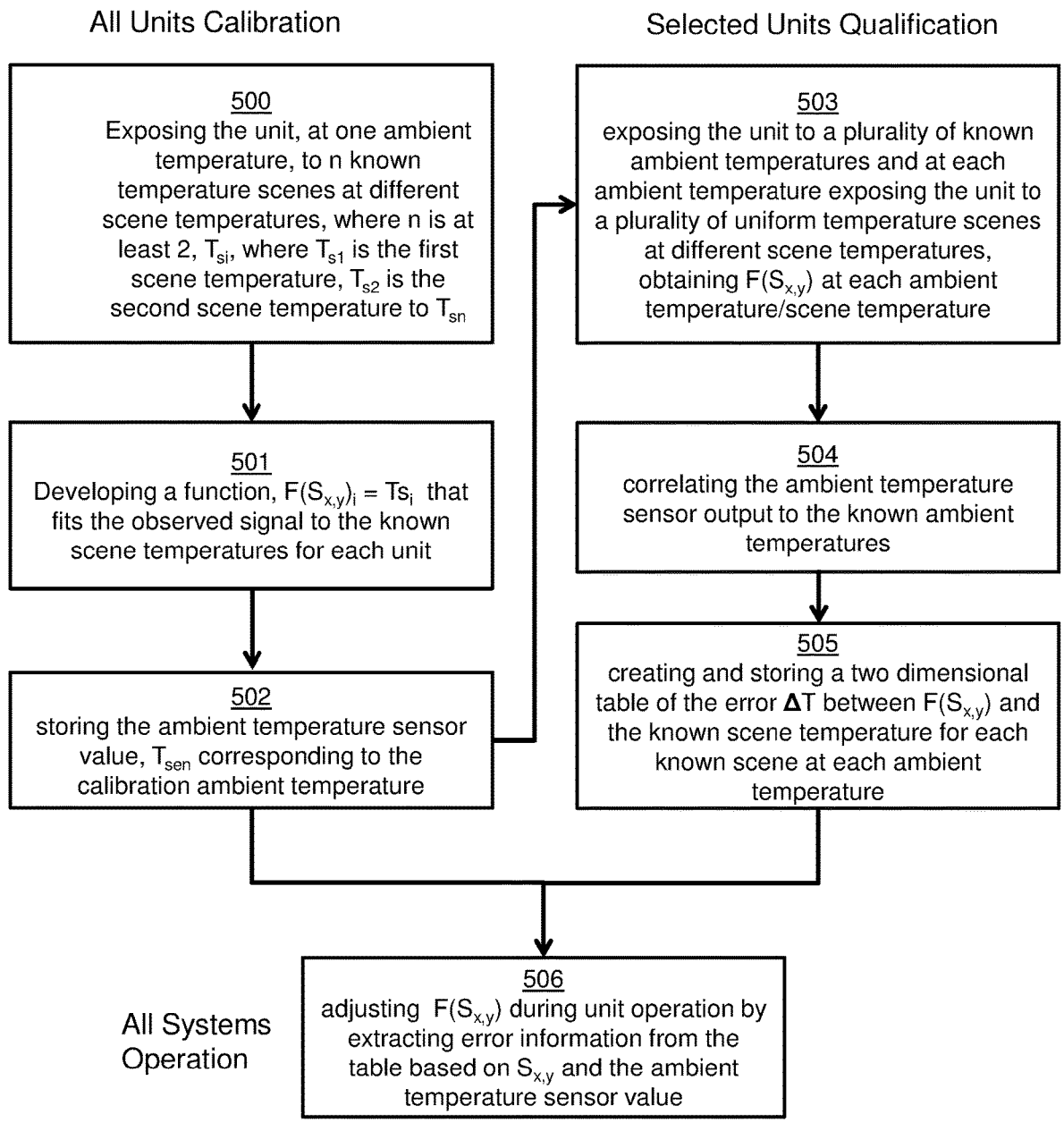
FIG. 5 illustrates a flow chart of an example thermography process.

FIG. 5 illustrates a flow chart of an example process for thermography. For ease of description, the process will be described as being performed by the imaging system 100 described herein with reference to FIGS. 1A and 1B as well as with the testing configurations described with reference to FIGS. 2 and 3. However, one or more of the steps of the process can be performed by any module or combination of modules in the imaging system 100. Similarly, any individual step can be performed by a combination of modules not shown in the imaging system 100. The example process of FIG. 5 can include an "all units calibration" portion in which all units are calibrated as described above with reference to FIG. 2, and a "selected units qualification" portion in which at least a portion of units selected from the previously calibrated units are further analyzed as described above with reference to FIG. 3. In various embodiments, selected units qualification can be performed on one or more, up to all of the calibrated units. For example, 1%, 5%, 10%, 25%, 50%, or more, or even all of the calibrated units may be further analyzed using the selected units qualification process. Because the qualification process may involve determining one or more coefficients based on statistical methods such as linear fit or the like (as described with reference to FIG. 3), the accuracy and/or statistical quality of the results of the qualification process may be enhanced by performing the qualification process on a relatively larger percentage of the calibrated units.

For all units calibration, in block 500, expose the unit to two or more known temperature scenes. For example, these may be uniform temperature scenes.

In block 501, develop a function $F(S_{x,y})$ that fits the observed signal to the known scene temperatures, the function being specific to each unit. For example the function may be a linear fit to the scene temperature data points.

In block 502, observe and store the temperature sensor value corresponding to the ambient temperature during the calibration test.

For selected units qualification testing, in block 503, expose the unit to a plurality of known temperature scenes, observe each scene at a plurality of ambient temperatures and calculate $F(S_{x,y})$ for each scene and each ambient temperature. For example, the known temperature scenes may be produced by a series of blackbodies at differing temperatures and the ambient temperature may be varied by placing the test unit in a temperature controlled chamber.

In block 504, correlate the temperature sensor values with the known ambient temperatures. For example it may be desirable to actually correlate to the temperature sensor values minus the stored value from calibration to reduce offset variations in the temperature sensors.

In block 505, create and store a table of the error between the known scene temperature and the value derived from $F(S_{x,y})$ for each scene/ambient temperature data point. For example this table may be derived from one unit or derived from aggregated data from multiple units. Once developed, the table may be loaded into all units of the same design, lot, version or any other suitable grouping, During post-calibration operational use for all units, at block 506, adjust $F(S_{x,y})$ by extracting error information from the table based on current signal and temperature sensor values at the time of performing in-use thermography. For example for $F(S_{x,y})$ and temperature sensor values between the table entries the error can be interpolated from the nearest table values.

Second all Unit Scene Temperature Calibration

Figure 7A:
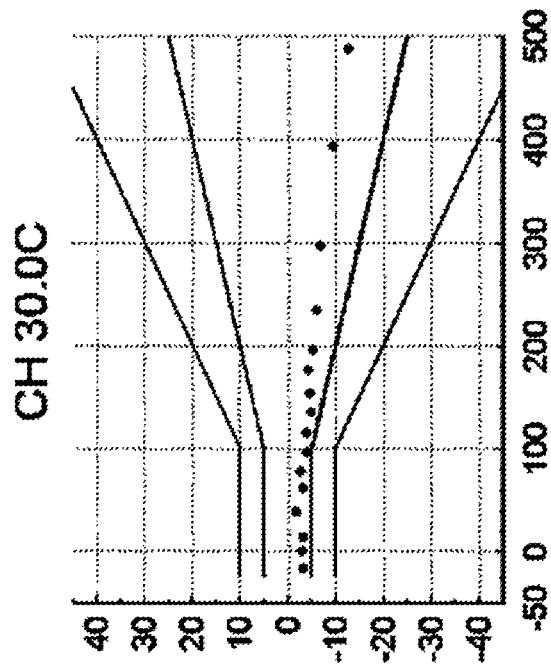
FIGS. 7A and 7B illustrate improvements achieved using the LUT.
Figure 7B:
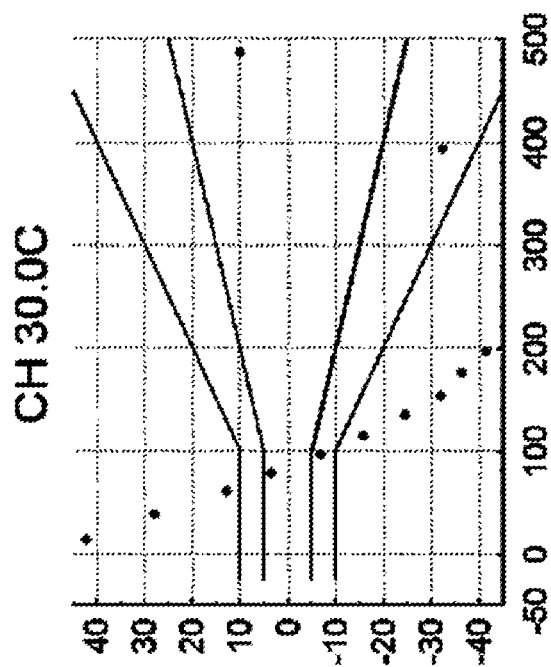

The combination of derivation of a per-unit function, applied to values derived from the look up table (LUT) produces beneficial results. The improvement is illustrated in FIGS. 7A and 7B, where 7A shows the temperature error in degrees Celsius as a function of scene temperature before the table is used, and 7B after the table is loaded and employed. However, the unit-to-unit variation may for many thermal imaging systems still produce temperature inaccuracies greater than desired. In these cases, it may be desirable to add a second scene temperature calibration applied to all units.

Figure 6:
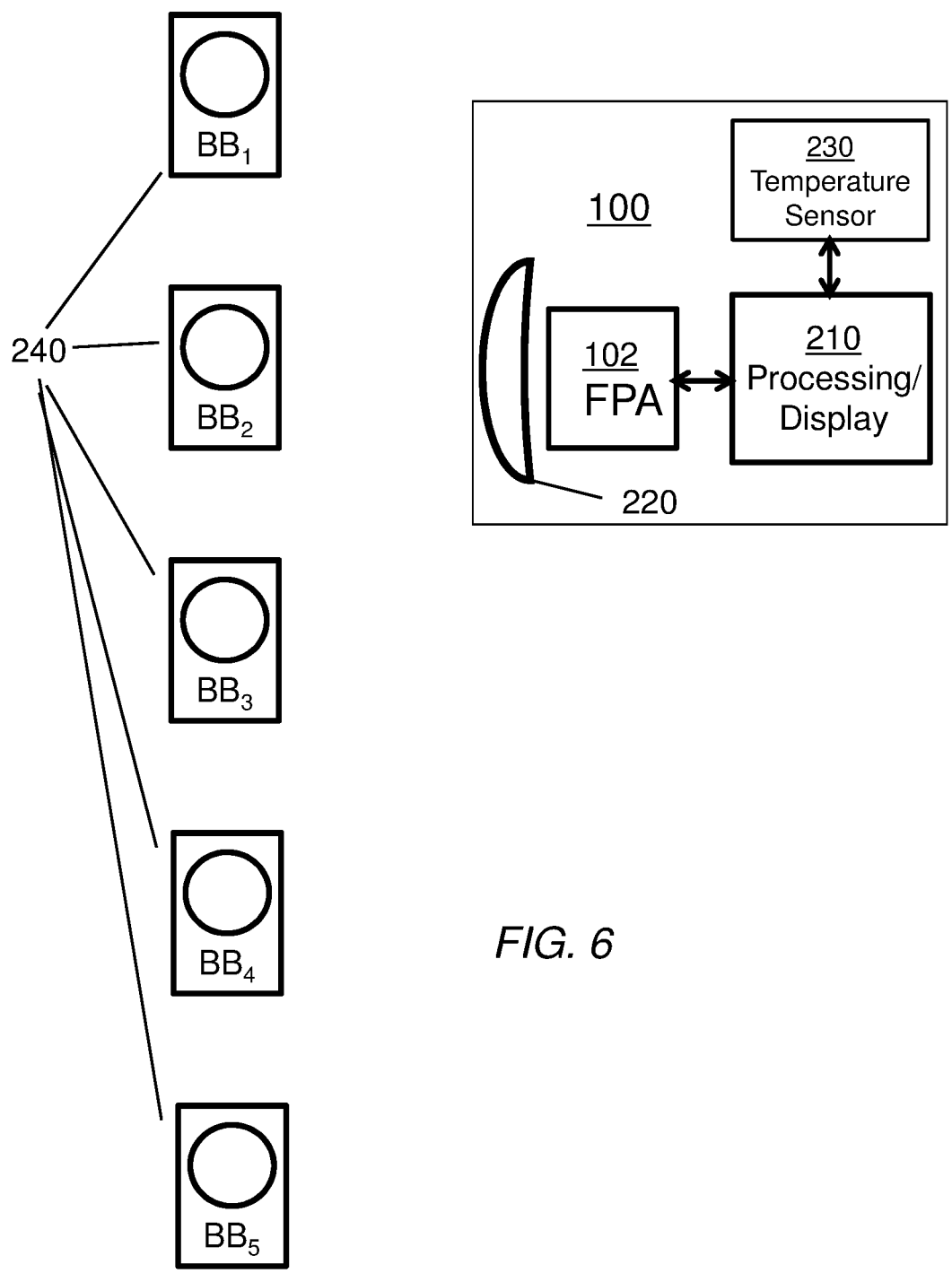
FIG. 6 illustrates an example second all unit calibration process.

As shown in FIG. 6 with the table loaded and the coefficients for the transfer function established, a second calibration may be performed on all units to verify and/or improve the accuracy of the calibration. Thermal Imager 100 will again be exposed to multiple scene temperatures, for example different temperature black bodies 240. The number may vary, but it may be advantageous to use more scene temperature than used for the first calibration. In FIG. 6, five scene temperatures are shown, but the number could clearly vary. Preferably, the number can be at least two for reasons which will be explained below. The second calibration is performed at one ambient temperature, so the test time can be small. The ambient temperature may be externally controlled, as for example using a chamber or a temperature-controlled mounting chuck. The temperature may also be room temperature, which is advantageous as little or no dwell time would be required for the imaging system temperature to stabilize. The ambient temperature may be measured externally, or the onboard temp sensor may be employed, making the test analogous to actual use.

Accordingly, during the second all units calibration, at each scene temperature, the calculated temperature is derived. The inputs to this derivation as described above are the ambient temperature, either derived from the temp sensor or externally supplied, the coefficients derived in the first calibration, the signal intensity, and the loaded LUT. The calculated temperature is compared to actual scene temperature. At this point, particularly if there are multiple scene temperatures, not only the variation of the measured from the derived temperature may be known at multiple points, but the shape or trend of that variation may be determined. The table is modified during the second calibration to make the derived values closer to the measured values. The whole table can be modified based on the data from the multiple points. For instance, in one example an offset may be added to each table value derived from an average error at each of the scenes. In another example, the error at each scene may be fit to a curve. For example, each table value may be modified by applying a tilt (slope) and offset to each table value derived from a linear fit of the error between calibration scene temperature and the calculated temperatures. In other embodiments, a more complex curve fit may be employed. Using any of the methods of modifying the table, at the end of the second calibration, each unit will have a unique LUT installed, which further improves the thermography accuracy of all units.

Figure 8A:
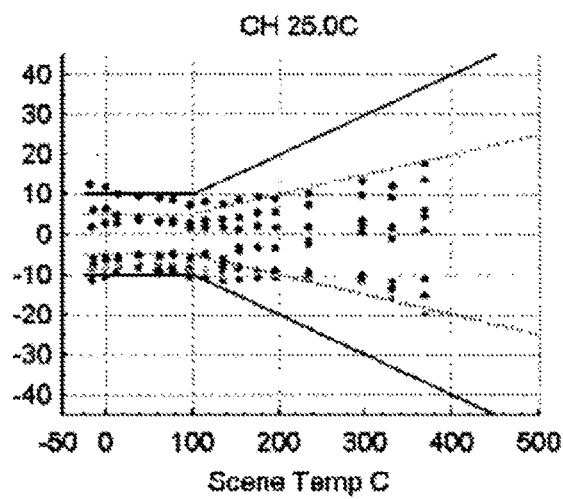
FIGS. 8A and 8B illustrate an example spread amongst individual parts using the LUT, and the improvement achieved by adding the second all unit calibration process.
Figure 8B:
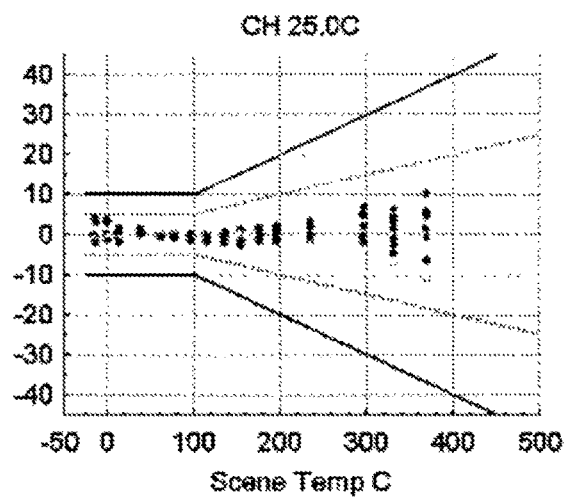

FIG. 8A shows a temperature error data from a several units with no second calibration, i.e. all units have the same LUT loaded. FIG. 8B shows error data from the same units after the second calibration is performed, i.e. each unit has a unique LUT. As can be scene the errors decrease significantly using the second calibration.

Figure 9:
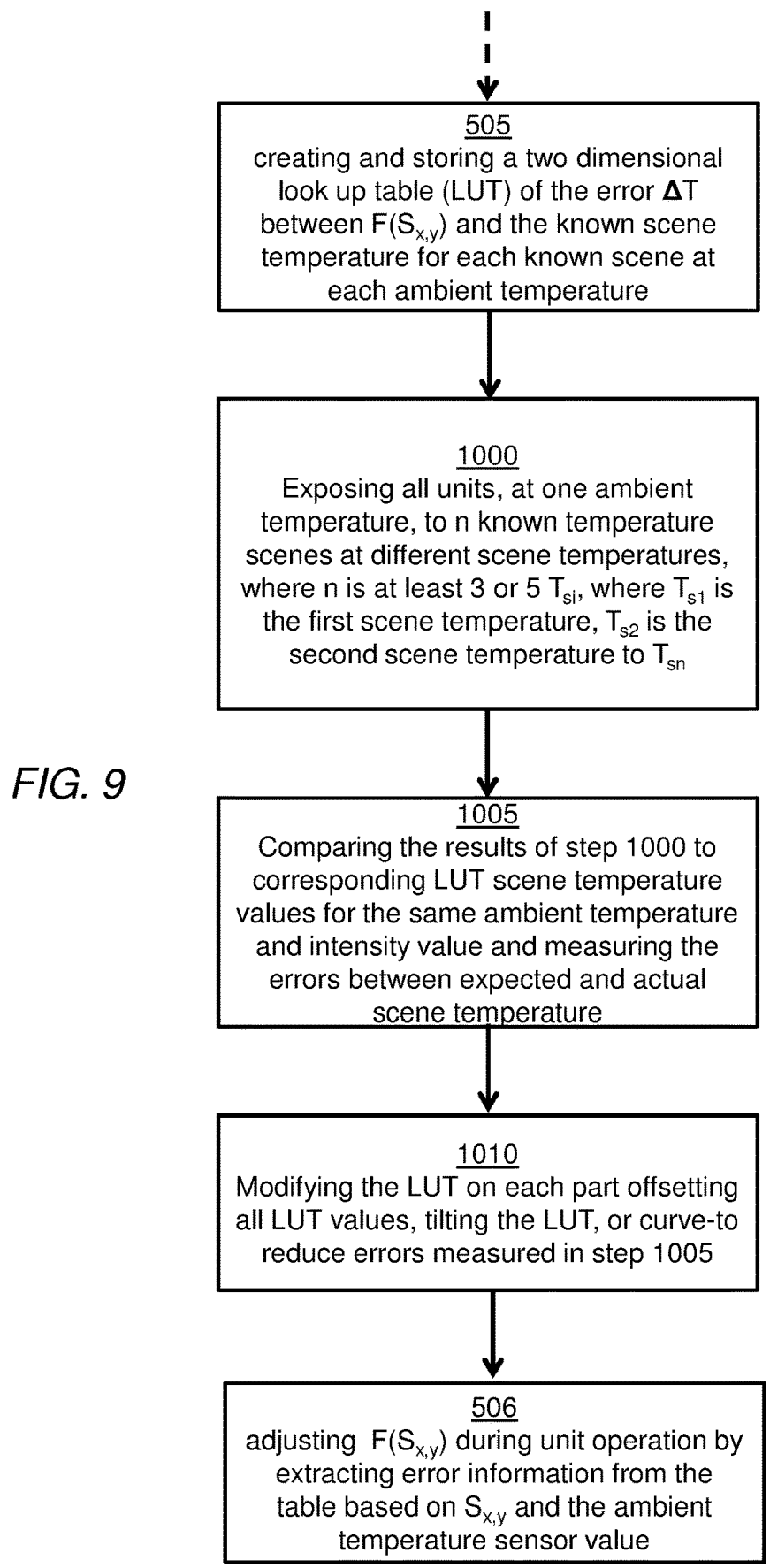
FIG. 9 illustrates a flow chart of adding the second all unit calibration step to an example thermography process.

FIG. 9 is a flow chart showing the second calibration inserted into the thermography calibration process.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A process for converting signal to temperature for a set of production thermal imaging systems, each thermal imaging system of the set of thermal imaging systems including an array of photodetectors each configured to output a signal $S_{x,y}$ corresponding to a temperature of a portion of an imaged scene, and an ambient temperature sensor, the process comprising:

performing a scene temperature calibration on all thermal imaging systems of the set of thermal imaging systems, the calibration comprising:
exposing each thermal imaging system, at a calibration ambient temperature, to n known temperature scenes, each known temperature scene having a unique scene temperature $T_{si}$, from $T_{si}$ to $T_{sn}$, wherein n is at least 2;
developing, based on the signal $S_{x,y}$, a unit-specific function $F(S_{x,y})_i = T_{si}$ that fits the signal to the known scene temperatures for each thermal imaging system; and
storing an ambient temperature sensor value $T_{sen}$ corresponding to the calibration ambient temperature;

performing a scene temperature/ambient temperature qualification test on a subset of previously calibrated thermal imaging systems of the set of thermal imaging systems, the qualification test comprising:
exposing each thermal imaging system of the subset to a plurality of known ambient temperatures and, at each ambient temperature, exposing the unit to a plurality of known temperature scenes at different known scene temperatures, obtaining a function $F(S_{x,y})$ for each combination of ambient temperature and scene temperature;
correlating the ambient temperature sensor output to the known ambient temperatures; and
creating a two-dimensional look-up table (LUT) of at least one of an error $\Delta T$ between $F(S_{x,y})$ and the known scene temperature for each known scene at each ambient temperature, or a known scene temperature $T_{act}$;
loading the LUT into all thermal imaging systems of the set of thermal imaging systems; and
performing a second scene temperature calibration on all thermal imaging systems of the set of thermal imaging systems, the second scene temperature calibration comprising:
exposing each thermal imaging system, at a calibration ambient temperature, to n known temperature scenes, each known temperature scene having a unique scene temperature $T_{si}$, from $T_{si}$ to $T_{sn}$, wherein n is at least 3,
comparing the scene temperature values derived from the LUT from corresponding intensity and ambient temperature values and measuring the errors between the derived and actual scene temperatures;
modifying the LUT on each thermal imaging system to better match the actual corresponding scene temperatures derived from the second calibration;
for individual thermal imaging systems of the set of thermal imaging systems, adjusting $F(S_{x,y})$ during subsequent operational use by extracting at least one of actual scene temperature or error information from the two-dimensional table based on $S_{x,y}$ and the ambient temperature sensor value.

2. The process of claim 1, wherein the known temperature scenes for both the calibration and qualification are blackbodies set at predetermined temperatures.

3. The process of claim 1, wherein the plurality of ambient temperatures is produced by placing the thermal imaging system in a temperature chamber and changing a chamber temperature of the temperature chamber in a predetermined manner.

4. The process of claim 1, wherein $F(S_{x,y}) = G(S_{x,y}) + O$, wherein G is a gain term and O is an offset term.

5. The process of claim 1, wherein the calibration ambient temperature is room temperature, and the temperature sensor value is $T_{senrt}$.

6. The process of claim 5, wherein the correlation to the chamber temperatures is developed for $\Delta Therm = T_{sens} - T_{sensrt}$.

7. The process of claim 6, wherein the temperature associated with the photodetector signal during operation is at least one of $T_{x,y} = G(S_{x,y}) + O + \Delta T$ or $T^x_{x,y} = T_{actx,y}$.

8. The process of claim 6, wherein a first axis of the two-dimensional table comprises the values of $F(S_{x,y})$ corresponding to each blackbody temperature and wherein a second axis of the two-dimensional table comprises $\Delta Therm$ values corresponding to each chamber temperature.

9. The process of claim 8, wherein the table developed is stored as a look-up table for each thermal imaging system of the set of thermal imaging systems, and wherein inputs to the look-up table are actual signal $F(S_{x,y})$ and $\Delta$Therm.

10. The process of claim 9, wherein, during operational use, if any given $F(S_{x,y})$ and $\Delta$Therm are not exactly equal to the table axis values, the error value $\Delta T$ used is determined by at least one of a 3 step linear interpolation, a bi-linear interpretation, or a bi-cubic interpolation of the table error values.

11. The process of claim 1 wherein the LUT is modified by at least one of offsetting the table, tilting the table or curve-fitting the table.

12. The process of claim 1 wherein the number of scene temperatures in the second calibration is one of 4, 5, or greater than 5.

13. The process of claim 1 wherein the ambient temperature of the second calibration is a room temperature of a test area.

14. The process of claim 1 wherein the ambient temperature of the second calibration is a fixed value of a temperature chamber.

15. The process of claim 1 wherein the wherein the ambient temperature of the second calibration is measured externally.

16. The process of claim 1 wherein the wherein the ambient temperature of the second calibration is derived from the ambient temperature sensor.

* * * * *